US011675510B2

(12) United States Patent
Zhao

(10) Patent No.: US 11,675,510 B2
(45) Date of Patent: *Jun. 13, 2023

(54) SYSTEMS AND METHODS FOR SCALABLE SHARED MEMORY AMONG NETWORKED DEVICES COMPRISING IP ADDRESSABLE MEMORY BLOCKS

(71) Applicant: Xiaoliang Zhao, McLean, VA (US)

(72) Inventor: Xiaoliang Zhao, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/743,108

(22) Filed: May 12, 2022

(65) Prior Publication Data
US 2022/0269411 A1 Aug. 25, 2022

Related U.S. Application Data

(63) Continuation of application No. 17/332,984, filed on May 27, 2021, now Pat. No. 11,360,681.

(60) Provisional application No. 63/030,305, filed on May 27, 2020.

(51) Int. Cl.
*G06F 3/06* (2006.01)
(52) U.S. Cl.
CPC ............ *G06F 3/064* (2013.01); *G06F 3/0604* (2013.01); *G06F 3/0679* (2013.01)
(58) Field of Classification Search
CPC ...... G06F 3/064; G06F 3/0604; G06F 3/0679; G06F 3/0665; G06F 3/067
See application file for complete search history.

(56) References Cited

U.S. PATENT DOCUMENTS

| | | | | |
|---|---|---|---|---|
| 9,680,931 | B1* | 6/2017 | Karnowski | H04L 49/90 |
| 10,649,679 | B2* | 5/2020 | Gill | G06F 9/5072 |
| 2016/0294983 | A1* | 10/2016 | Kliteynik | G06F 15/17331 |
| 2016/0366094 | A1* | 12/2016 | Mason | G06F 3/061 |
| 2018/0150343 | A1* | 5/2018 | Bernat | G06F 13/4027 |
| 2019/0034289 | A1* | 1/2019 | Natanzon | G06F 3/0608 |
| 2019/0042122 | A1* | 2/2019 | Schmisseur | G11C 29/44 |

* cited by examiner

*Primary Examiner* — Francisco A Grullon
(74) *Attorney, Agent, or Firm* — Robert L Protheroe

(57) ABSTRACT

Systems and methods for scalable shared memory among networked devices comprising IP addressable memory blocks is disclosed. The disclosed systems and methods comprise a communications network, one or more memory lending devices, each comprising one or more allocated and/or available uniformly sized blocks of memory remotely lendable over the communications network, wherein each of the one or more blocks of memory are uniquely addressable over the communications network using an Internet Protocol (IP) destination address. The systems and methods comprise further comprise at least one memory borrowing device comprising one or more remote blocks of memory allocated (loaned) thereto, wherein the at least one memory borrowing device is configured to individually access each of the one or more remote blocks of memory allocated thereto over the communications network using a unique Internet Protocol (IP) destination address.

20 Claims, 6 Drawing Sheets

SYSTEMS AND METHODS FOR SCALABLE SHARED MEMORY AMONG NETWORKED DEVICES COMPRISING IP ADDRESSABLE MEMORY BLOCKS

CROSS-REFERENCE TO RELATED APPLICATIONS

This application is a continuation of copending U.S. application Ser. No. 17/332,984, filed May 27, 2021, which claims the benefit of U.S. Provisional Application No. 63/030,305, filed May 27, 2020, each of which is incorporated by reference herein in its entirety.

FIELD OF THE DISCLOSURE

The present disclosure relates to memory resources of networked devices, and more specifically relates to systems and methods for scalable shared memory among networked devices comprising IP addressable memory blocks.

SUMMARY

Various implementations of systems and methods for scalable shared memory among networked devices comprising IP addressable memory blocks are disclosed, wherein the networked devices may include network connected servers and network connected computers. In an illustrative implementation, a spine-leaf communications network topology is disclosed as one possible network configuration in which to implement the present invention, but such a system configuration is not a requirement and many possible system configurations are possible in practicing the present invention, as will be understood by those persons having ordinary skill in the art and the teaching of the present disclosure.

The disclosed illustrative implementations comprise system elements configured to enable scalable shared memory among networked devices comprising IP addressable memory blocks according to the present application and include components and methods leveraging technologies such as IPv6 adapted to be used to directly address a remote memory block over the network, Border Gateway Protocol (BGP) to be used as a signaling protocol adapted to facilitate allocation of lendable sharable memory blocks from lender devices to borrower devices, and Remote Direct Memory Over Converged Ethernet (RoCEv2) to be used to transfer memory blocks with low latency and low overhead by direct memory accesses on both the lender device and borrower device and over high speed Ethernet technologies including 40 Gigabit Ethernet (40 GbE) and 100 Gigabit Ethernet (100 GbE).

Most modern Operating Systems (OS) implement Virtual Memory (VM) so the memory resource can be managed more efficiently. VM introduces another abstraction layer of memory for the purpose of sharing physical memory among applications, especially through swapping out infrequently used data of application A from physical memory to another media, usually hard disk, to make room for another application B. Consequently, an application's virtual memory space is dynamically mapped to physical memory in pages. When an application is trying to access a memory page which is not resident in physical memory due to page swapping out, a page fault occurs.

Traditionally, a page fault event may be handled by loading the missing page from local hard disk. The present invention may load the missing page from a remote memory addressable by Internet Protocol (IP), and the term Internet Addressable Memory (IAM) may be used in the present disclosure accordingly. Advances in networking technology, such as 100 Gbps Ethernet, provides data access at least two orders of magnitude lower latency and higher throughput than hard disks, and 100 Gbps networks (about 12.5 GB per second) have reached similar throughput levels of DDR4 DRAM (about 12.8 GB to 19.2 GB per second depending on the memory clock). As such, data may be moved through a network at a speed similar to that of primary memory. To maximize the network data transfer rate, IAM employs RoCEv2. RoCEv2 is a relatively new protocol and it brings together the ubiquitous IP network connectivity and RDMA's technical benefits, such as low latency, high throughput and low CPU utilization, wherein data may be transferred at almost line rates with nearly zero CPU overhead and very low latency.

IP addressable memory blocks when combined with other features disclosed herein, may be used to provide significant scalability of shared memory resources. Memory block can be addressed and can be accessed by an application through the existing IP network infrastructure. In the event of a page fault, the missing page may be located in another machine's memory connected by an IP network, or even the Internet. When combined with VM technology and features as disclosed herein, it is possible to provide an application with a significantly scalable address space. Moreover, IAM leverages the tremendous address space available in IPv6. Current IPv4 uses 32 bits to address a host on the Internet, while IPv6 uses 128 bits, which is sufficiently large enough to address any arbitrary byte in a memory on today's most popular 64-bit systems.

Using IPv6 to directly address a remote memory also brings performance benefits. It is because page fault is a system-level event which happens frequently, so the number of CPU cycles to handle a page fault will impact the overall system performance. Given a virtual address X of a missing page, one need to map at least once X to another form of address Y which can be used to locate the page at another location. If Y is an intermediate result, more CPU cycles have to be spent to lookup more mapping tables. IAM embeds the memory address directly into an IPv6 address, so it only need one lookup to locate both the remote machine and the memory location. As such it is a highly direct memory mapping method which reduces the CPU cycles for table lookups to a minimum.

IAM maintains a mapping table to map an application's virtual address space to a number of IPv6 addresses. In order to populate the content of this mapping table a borrower agent is given a lender device's remote memory IPv6 address. The present application adapts routing protocols such as Border Gateway Protocol (BGP) to facilitate discovery and announcements of lendable memory blocks and their associated IPv6 addresses. BGP is an inter-domain routing protocol, through which hundreds of thousands of networks are logically connected together. BGP is a critical technology to the success of the Internet scaling, partially because of its auto-discovery feature. When a new network is connected to the Internet, BGP will automatically propagate the new network information to the rest of the Internet so that the new network can be reached by others. This feature of BGP enhanced and adapted facilitate IAM's and its scalability. Moreover, instead of relying on a centralized information store, BGP propagates the information to all participants, which makes BGP-based approach more resilient to single point of failure.

An IAM system can be built with a number of machines (networked devices) and each machine may run an IAM agent which is a piece of software configured to manage local memory resources and communicate with other IAM agents. An IAM agent may reserve a (big) chunk of memory from the local machine and divide it into a number of equal sized memory blocks, for example, 64KiB blocks. In addition, an IAM agent may implement the following functionalities:

Memory Addressing: Each memory block is uniquely mapped to an IPv6 address. Such direct mapping between memory address space and IPv6 address space makes it possible that a memory is addressable not only by a local processor, but also by any processor in the network or even the Internet.

Memory Announcement: Every agent announces its total number of memory blocks, Mi, and currently available memory blocks, Vi, to other IAM agents through BGP. At any given time, the total memory capacity of an IAM system is determined by M=ΣMi and total available memory is determined by V=ΣVi. M may change whenever new memory resources are added to or removed from IAM system, while V may change whenever memory blocks are allocated or returned by applications. BGP synchronizes the IAM system for all agents to derive the same M and V value. Furthermore, the IPv6 addresses of contiguous memory blocks can be naturally aggregated into a network prefix, so to reduce the number of memory announcements.

Memory Reservation, Allocation and Return: When an application requests X memory blocks from an IAM system, the IAM agent running on the same machine, the borrower agent, will first allocate its own memory to the application for the optimal performance, then it selects a number of peer agents, the lender agents, based on several criteria such as their respective available memories, the network characteristics and others. The first step is a reservation-confirmation process to make sure the memory will be reserved before allocated in order to reduce the possible racing conditions. Once all memories are confirmed, the lender agents send to the borrower the lists of IPv6 addresses corresponding to the reserved memories via standard BGP Network Layer Reachability Information (NLRI) message. The access control policy, i.e., read only or read-write, can be expressed in BGP community attributes. In the meanwhile, the new Vi value may be broadcasted via BGP as well. At the end of this process, the borrower agent will be able to build a mapping table, mem-to-ip table, between the application's virtual address space to the IPv6 addresses. With the support of IAM, an application's virtual address space can scale from few terabytes up to exabytes, only depending on the underlying physical memory resources. Similarly, when the application frees up the memory, a lender agent will claim its memory back by sending a standard BGP withdrawal message.

Memory Data Access: When an application access a memory page and that page is not present in the page table, a page fault occurs. Usually the way OS handles a page fault is to consult the file system and to load the missing page from the disk. In an IAM system, an IAM agent will lookup the mem-to-ip mapping table to identify the corresponding IPv6 address of the missing page. Once an IPv6 address is identified, the IAM agent instructs RoCEv2 to transfer data from the corresponding lender agent. The lender agent extracts the memory address directly from the IPv6 address. Once the memory addresses on both sides are pinpointed, RoCEv2 copies data directly from the lender's memory to the application with very low latency.

BRIEF DESCRIPTION OF THE SEVERAL VIEWS OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of the disclosed subject matter.

DETAILED DESCRIPTION

Various example implementations of systems and methods for scalable shared memory among networked devices comprising IP addressable memory blocks are disclosed herein; however, the disclosed implementations are illustrative and many other implementations are possible within the scope of the present invention. In addition, each of the examples given in connection with the various implementations is intended to be illustrative, and not restrictive.

The following detailed example implementations refer to the accompanying drawings. The same reference number may appear in multiple drawings and when appearing in multiple drawings will identify the same or similar elements.

Figure 1A:
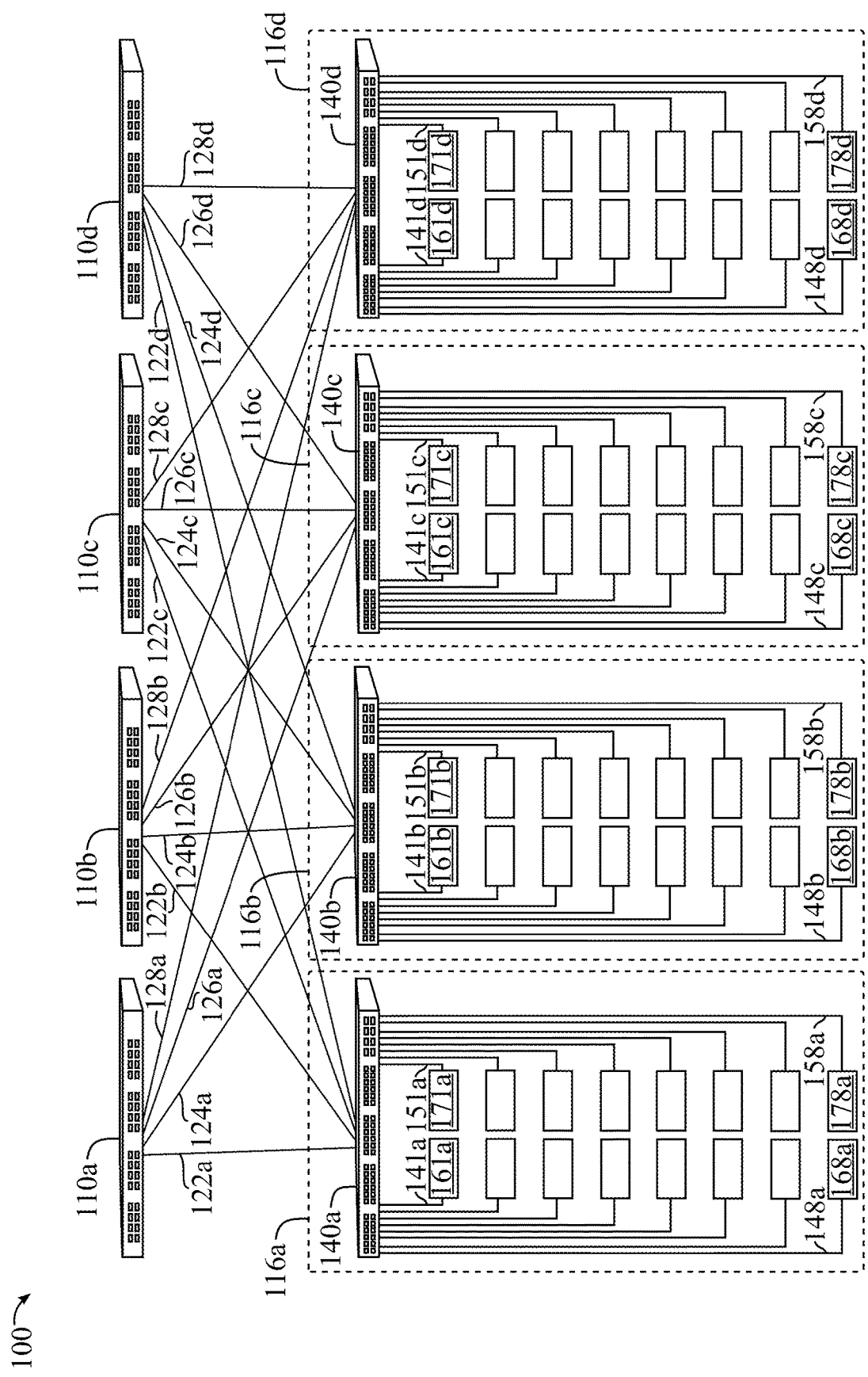
FIG. 1A depicts an example implementation of a system and a communications network topology interconnecting networked devices.

FIG. 1A depicts an example implementation of a system 100 and a communications network topology interconnecting networked devices. System 100 is an illustrative implementation of a spine-leaf communications network topology. System 100 comprises spine switches 110a, 110b, 110c and 110d, each of which a connected to each leaf switch 140a, 140b, 140c and 140d as shown via communications links 122a-122d, 124a-124d, 126a-126d and 128a-128d. Each leaf switch 140a, 140b, 140c and 140d is connected to a plurality of networked devices such as networked servers and networked computers, wherein FIG. 1A notes only shows a representative number of reference numbers, namely networked devices 161a-161d, 168a-168d, 171a-171d and 178a-178d, wherein each are connected to respective leaf switches 140a, 140b, 140c and 140d as shown via communications links 141a-141d, 148a-148d, 151a-151d and 158a-158d, respectively.

Figure 1B:
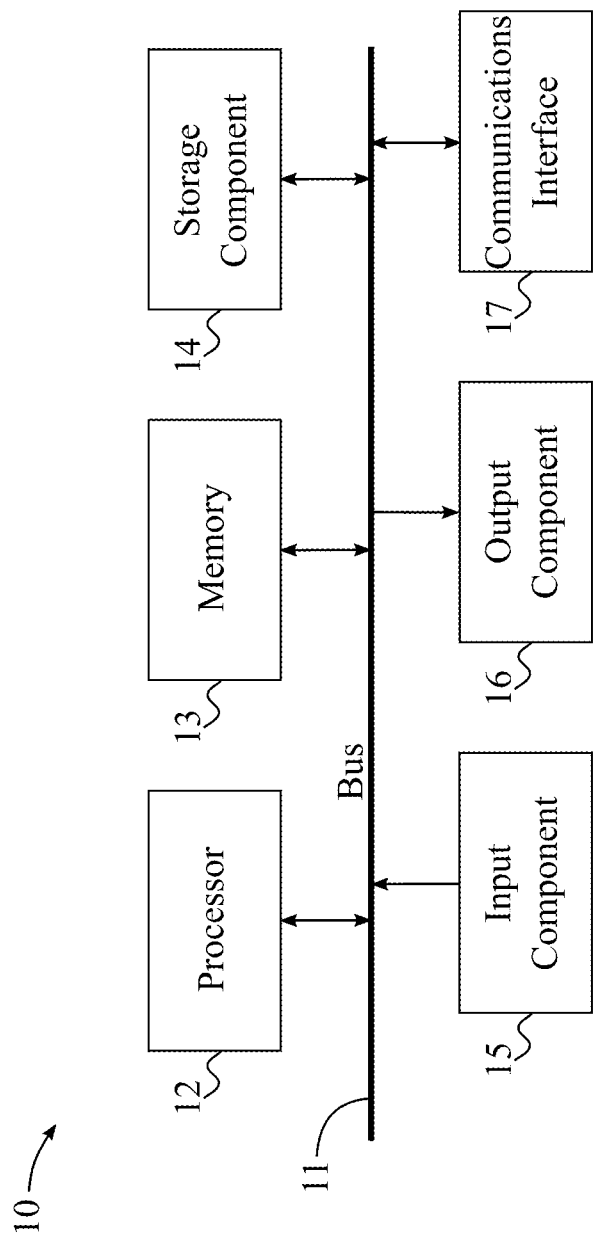
FIG. 1B depicts an example block diagram of example components of a device which may correspond to various networked devices and may correspond to one or more networked devices comprised by the system of FIG. 1A.

FIG. 1B is an example block diagram of example components of a device 10, wherein device 10 may correspond to various networked devices, such as a network connected server or a network connected computer. Device 10 may correspond to one or more networked devices comprised by system 100 of FIG. 1A.

Bus 11 includes a component that permits communication among the components of device 10. Processor 12 may be implemented in hardware, firmware, or a combination of hardware and firmware. Processor 12 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 12 may include one or more processors capable of being programmed to perform a function. Memory 13 may include a random access memory (RAM), a read only memory (ROM), and/or another type of dynamic or static storage device (e.g., a flash memory, a magnetic memory, and/or an optical memory) that stores information and/or instructions for use by processor 12.

Storage component 14 may store information and/or software related to the operation and use of device 10. For example, storage component 14 may include a hard disk (e.g., a magnetic disk, an optical disk, a magneto-optic disk, and/or a solid state disk), and/or another type of non-transitory computer-readable medium, along with a corresponding drive.

Input component 15 may include a component that permits device 10 to receive information, such as via user input (e.g., a keyboard, a keypad, a mouse, a button, a switch, etc.). Output component 16 may include a component that provides output information from device 10 (e.g., a display, a speaker, etc.).

Communication interface 17 may include a transceiver-like component (e.g., a transceiver and/or a separate receiver and transmitter) that enables device 10 to communicate with other devices, such as via a wired connection, a wireless connection, or a combination of wired and wireless connections. Communication interface 17 may be a network interface adapter. Communication interface 17 may permit device 10 to receive information from another device and/or provide information to another device. For example, communication interface 17 may include an Ethernet interface, an optical interface, a radio frequency (RF) interface, a Wi-Fi interface, a cellular network interface, or the like.

Device 10 may perform one or more processes described herein. Device 10 may perform these processes in response to processor 12 executing software instructions stored by a non-transitory computer-readable medium, such as memory 13 and/or storage component 14. A computer-readable medium is defined herein as a non-transitory memory device. A memory device includes memory space within a single physical storage device or memory space spread across multiple physical storage devices.

Software instructions may be read into memory 13 and/or storage component 14 from another computer-readable medium or from another device via communication interface 17. When executed, software instructions stored in memory 13 and/or storage component 14 may cause processor 12 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 1B are provided as an example. In practice, device 10 may include additional components, fewer components, different components, or differently arranged components than those shown in FIG. 1B. Additionally, or alternatively, a set of components (e.g., one or more components) of device 10 may perform one or more functions described as being performed by another set of components of device 10.

Figure 2:
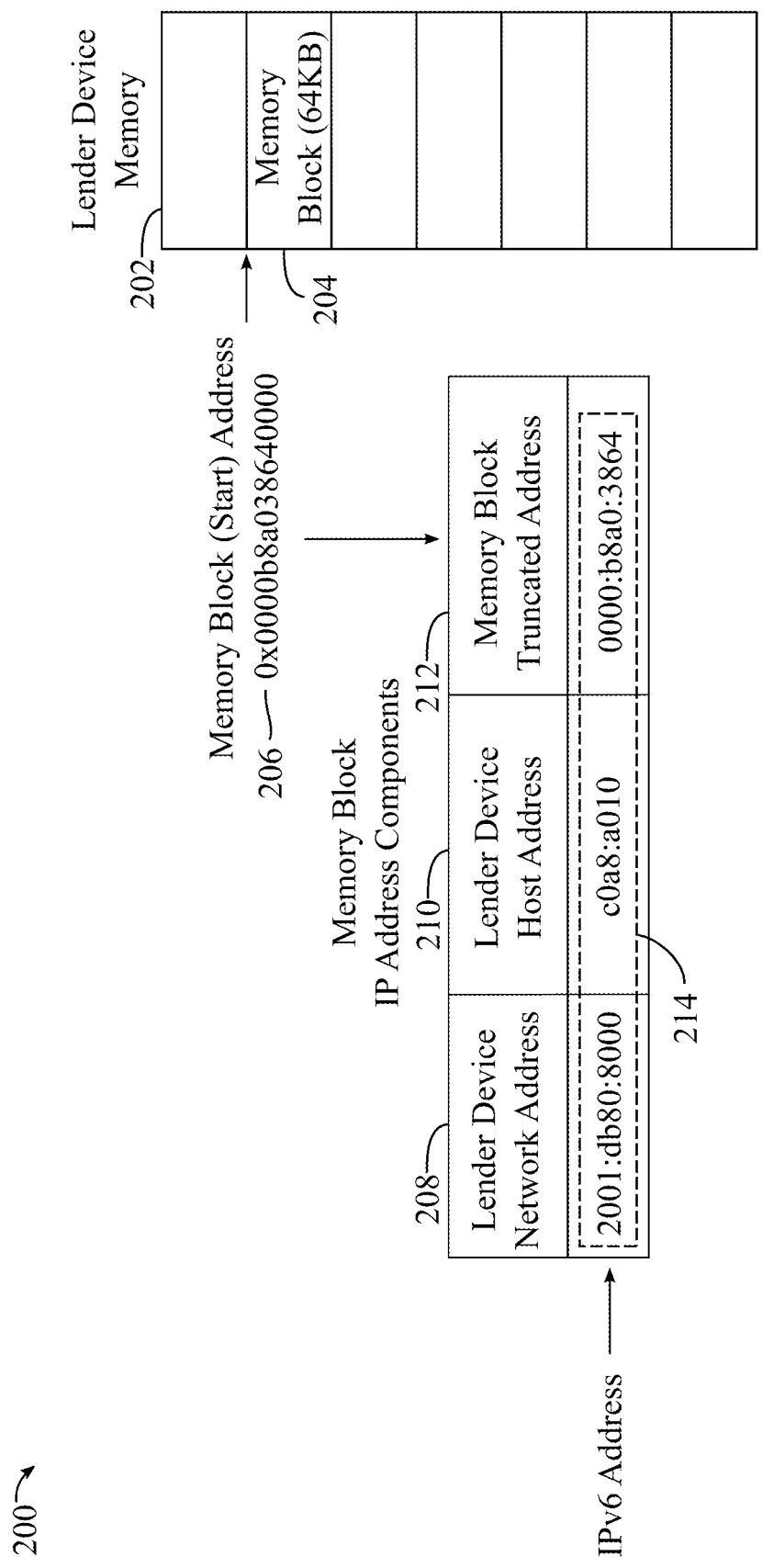
FIG. 2 depicts an example implementation of generating a unique IP address for a memory block.

FIG. 2 depicts an example implementation 200 of generating a unique IP address within the 128 bit length of an IPv6 address (such as a source address or a destination address) for a memory block. As depicted in FIG. 2, a memory of a lender device, such as a networked device like 161*a*-161*d*, 168*a*-168*d*, 171*a*-171*d* or 178*a*-178*d* of FIG. 1A comprises a memory block 204 have a starting memory address 206 of 0x0000b8a038640000. In the example implementation of FIG. 2, the memory block is 64 KB (or 65,536B), but other sizes may be used, such as 4 KB (or 4096B) which is a common memory page size in virtualized memory systems. Lender device associated with lender memory 202 has a network address component 208 of 2001:db80:8000 and a lender device host address component 214 of c0a8:a010. Since in the example illustration, the memory block size is 64 KB, the lower 16 bits of memory block start address 206 may be truncated, wherein the memory block truncated address 212 of 000:b8a0:3864 is sufficient to determine memory block 204 within lender device memory 202. The IPv6 address indicated within the dashed lined box 214 resulting from the concatenation of components 208, 210 and 212 is 2001:db80:8000:c0a8:a010:0000:b8a0:3864 and may be used to individually and uniquely address memory block 204 over the network of the associated lender device of lender device memory 202.

Figure 3:
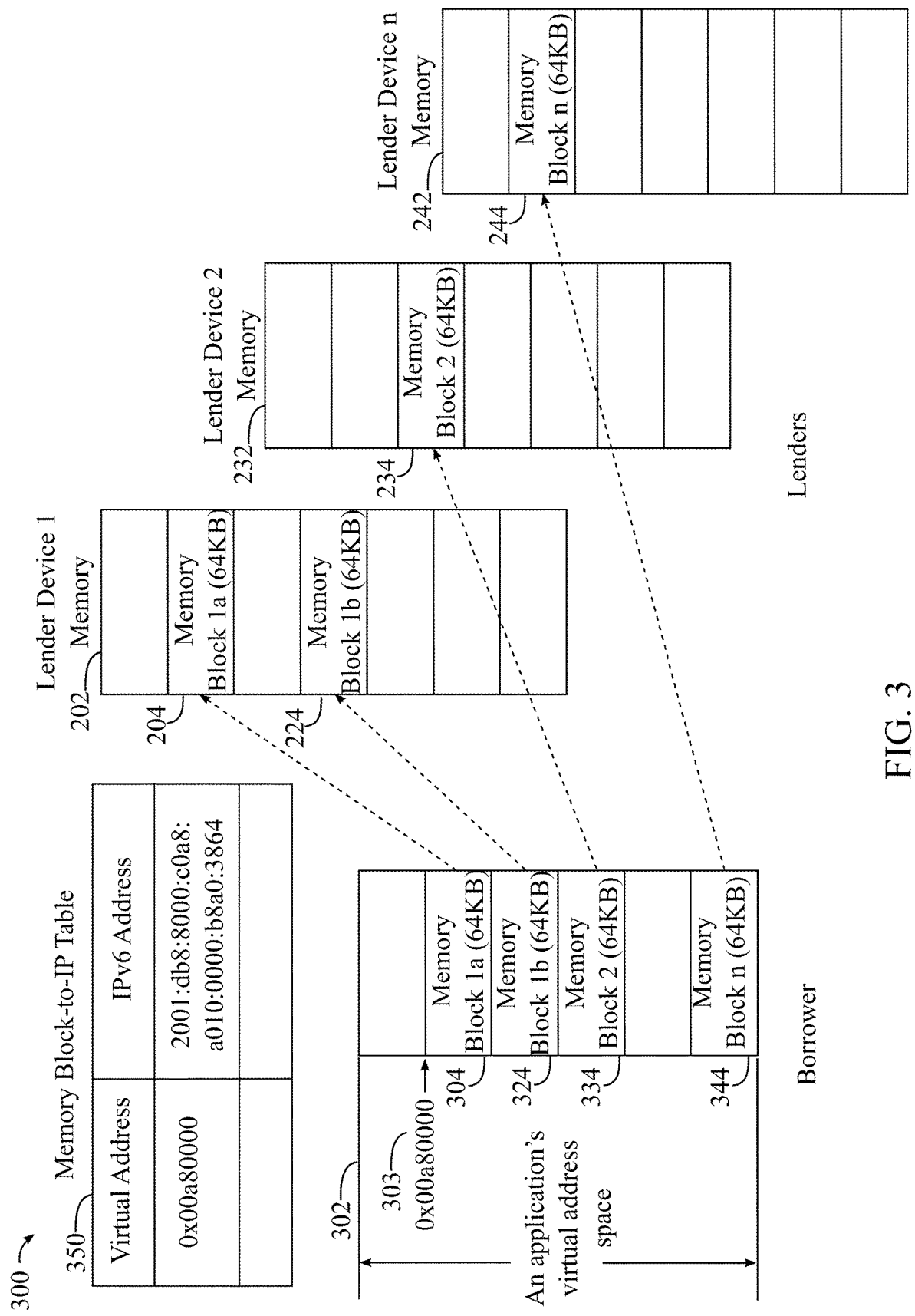
FIG. 3 depicts an example implementation of virtual memory block to IP addressable memory block mapping.

FIG. 3 depicts an example implementation of virtual memory block to IP addressable memory block mapping 300 which may be used to construct a memory block-to-IP mapping table 350 which may associate a virtual address space 302 useable by a process or application of a borrower device to IPv6 addressable memory blocks allocated thereto by a plurality of lender devices having lender device 1 memory 202, lender device 2 memory 232 and lender device n memory 242 wherein memory blocks 204, 224, 234 and 244 are allocated and mapped to an application's virtual address space 302 to memory blocks 304, 324, 334 and 344, respectively. Note that in the example mapping 300 in FIG. 3, memory block 304 has a starting address 303 in virtual address space 302 of 0x00a90000.

Figure 4:
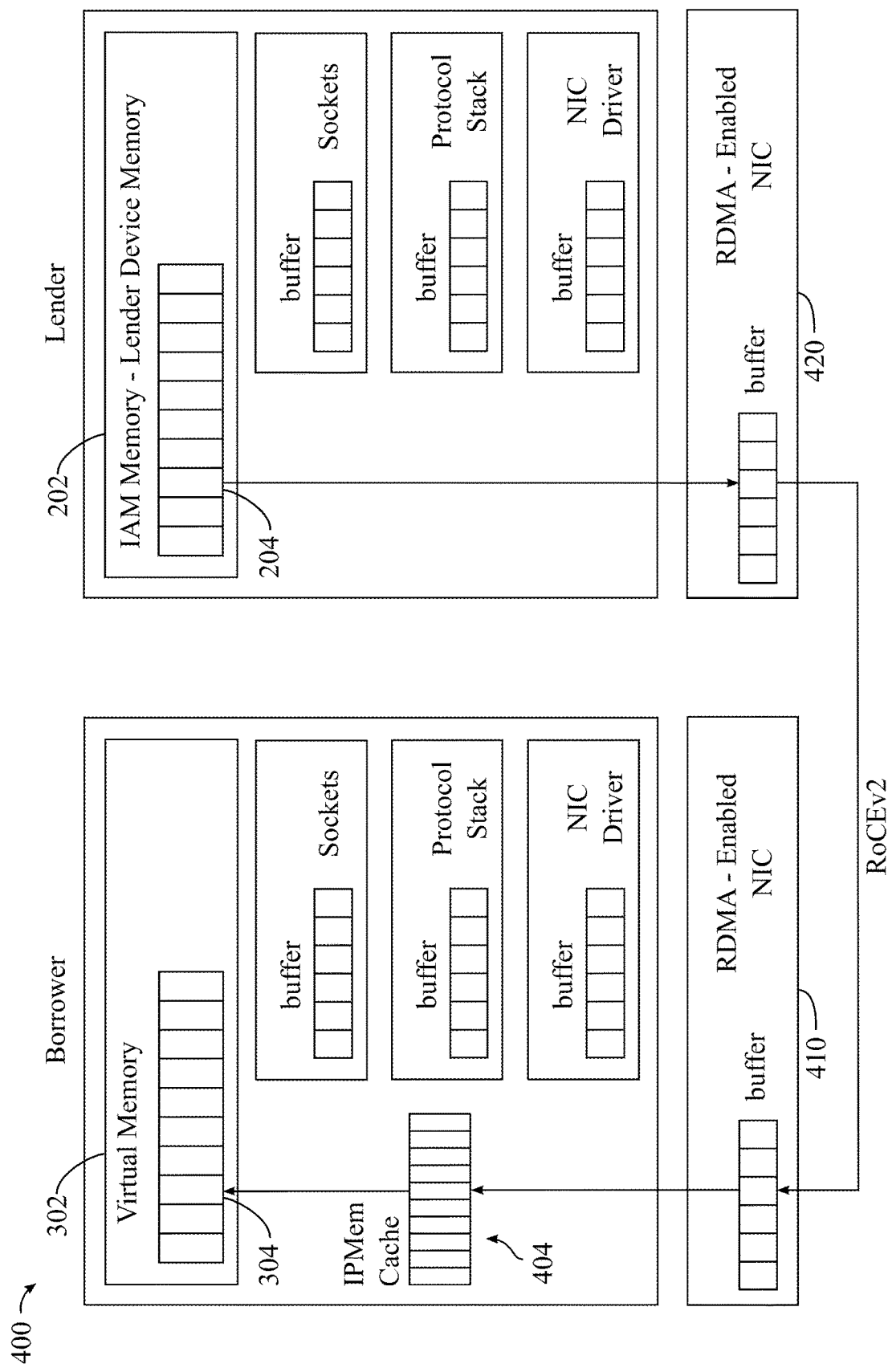
FIG. 4 depicts block diagram of an example implementation of a direct memory transfer of a memory block from a lender memory to a borrower memory.

FIG. 4 depicts block diagram 400 of an example implementation of a direct memory transfer of a memory block 204 from a lender memory 202 to a borrower virtual memory 302 abstracted within a physical cache memory, IPMem cache 404. As shown in FIG. 4, RDMA—enabled NIC 420 on the lender device and RDMA-enabled NIC 410 on the borrower device are used to directly access lender memory 202 and transfer memory block 204 via remote direct memory access over converged Ethernet (RoCEv2) to direct access and insert the block into IPMem cache 404 mapped to virtual memory 302 memory block 304.

Figure 5:
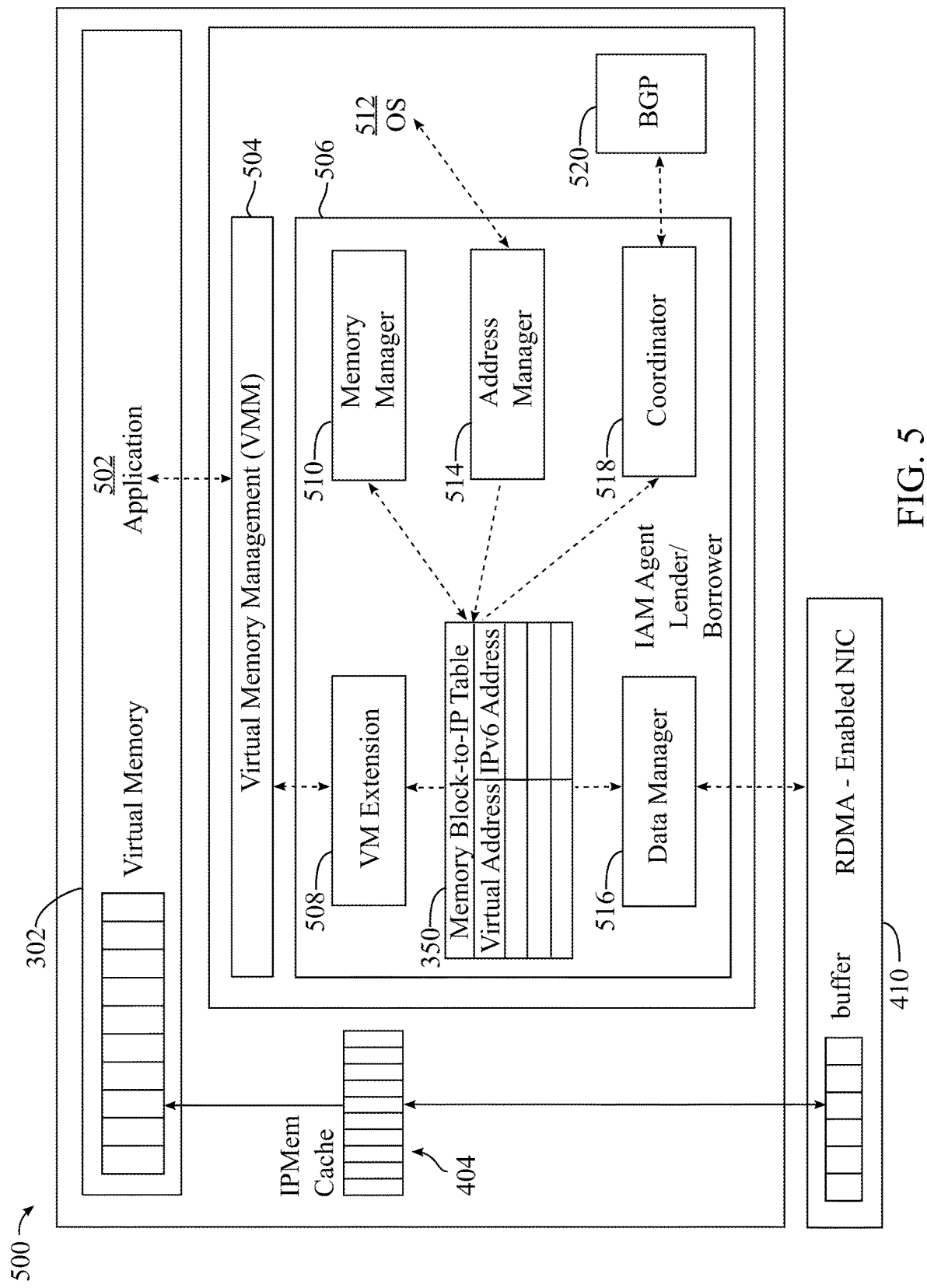
FIG. 5 depicts an example implementation of a block diagram of an Internet Addressable Memory agent.

FIG. 5 depicts an example implementation of a block diagram 500 of an Internet Addressable Memory agent. In the example block diagram 500, the IAM agent software 506 is configured in modules as shown in FIG. 5, namely, VM Extension module 508, Memory Manager 510, Address Manager 514, Corrdinator 518 and Data Manager 516. Also depicted within the IAM Agent 506 is Memory Block-to-IP Mapping Table 350.

Address Manager 514 manages IPv6 address assignment. After the local machine (networked device) allocates memory to the IAM agent 506 and the memory is divided into equal-sized memory blocks, the Address Manager 514 assigns each block a unique IPv6 address. For network traffic to reach those IPv6 addresses, the Addressing Manager is responsible to interface with the OS 512 networking module to register them to the routing table.

VM Extension 508 interfaces to Linux Virtual Memory Management (VMM) 504. VM Extension 508 captures and processes the page fault events and is responsible for maintaining the mem-to-ip table required to maintain Virtual Memory 302 for Application 502.

Memory Manager 510 manages the local memory resources and enforces data consistency and concurrency semantics. Memory Manager 510 also responds to the memory reservation, allocation and return requests from other IAM agents.

Coordinator 518 coordinates with other IAM agents via BGP 520 and other signaling protocols.

Data Manager 516 interfaces with Network Interface Card (NIC) 410 to drive RDMA data transfer through RoCEv2 protocol directly into IPMem Cache 404.

The present disclosure is not to be limited in terms of the particular implementations described in this application, which are intended as illustrations of various aspects. Moreover, the various disclosed implementations can be interchangeably used with each other, unless otherwise noted. Many modifications and variations can be made without departing from its spirit and scope, as will be apparent to those skilled in the art. Functionally equivalent methods and components within the scope of the disclosure, in addition to those enumerated herein will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular implementations only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

Various modifications to the disclosed implementations herein may be made without departing from the spirit and scope of the present invention.

What is claimed is:

1. A system for shared memory among networked devices, comprising:
   a communications network;
   one or more memory lending devices, each comprising:
      a communications link to the communications network;
      a lender agent comprising instructions executable by a processor;
      one or more processors configured to execute instructions of the lender agent; and
      one or more blocks of physical memory remotely lendable over the communications network, wherein the lender agent is configured to assign an Internet Protocol (IP) address for each of the allocated one or more blocks of physical memory; and
   at least one memory borrowing device comprising:
      a communications link to the communications network;
      a borrower agent comprising:
         instructions executable by a processor; and
         a Virtual Machine (VM) Extension configured to determine an IP address of a block of physical memory allocated to the at least one memory borrowing device when access thereto is required thereby;
      one or more processors configured to execute instructions of the borrower agent; and
      one or more remote blocks of physical memory allocated (loaned) thereto, wherein the at least one memory borrowing device is configured to individually access each of the one or more remote blocks of physical memory allocated thereto over the communications network using an IP address.

2. The system of claim 1, wherein the lender agent is further configured to reserve for lending one or more blocks of physical memory from memory resident thereon and assign an IP address useable to map each lendable block of physical memory reserved thereon.

3. The system of claim 2, wherein the lender agent is further configured to communicate a number indicating the number of lendable blocks of physical memory.

4. The system of claim 3, wherein the borrower agent is configured to secure allocations of blocks of physical memory from the one of more memory lending devices and to receive permission to access contents of each block of physical memory allocated thereto.

5. The system of claim 4, wherein the borrower agent is further configured to build a memory map table mapping allocated blocks of physical memory to their assigned IP addresses, wherein the memory map table is usable to map an application's virtual address space to the assigned IP addresses.

6. The system of claim 5, wherein:
the at least one memory borrowing device comprises an application having a virtual address space mapped to the assigned IP addresses; and
upon an occurrence of a page fault related to the application, the borrower agent of the at least one memory borrowing device is further configured to determine from the memory map table an IP address of a required block of physical memory and a local address to which to copy contents from the required block of physical memory to facilitate a retrieval of the contents from the required block of physical memory.

7. The system of claim 6, wherein the retrieval of the contents from the required block of physical memory uses Remote Direct Memory Access over Converged Ethernet (RoCE).

8. The system of claim 6, wherein the VM Extension is further configured to capture and process the page fault.

9. The system of claim 4, further comprising a coordinator, wherein the coordinator facilitates allocation of blocks of physical memory between the one or more memory lending devices and the at least one memory borrowing device, wherein the coordinator coordinates via Border Gateway Protocol (BGP) and interacts with the lender agent and the borrower agent.

10. The system of claim 4, wherein the borrower agent is further configured to relinquish the secured allocations of the blocks of physical memory allocated thereto, back to the associated one or more memory lending devices when no longer needed.

11. A method for shared memory among networked devices, comprises:
providing a system, comprising:
a communications network;
a memory lending device, comprising:
a communications link to the communications network;
a lender agent comprising instructions executable by a processor;
one or more processors configured to execute instructions of the lender agent; and
one or more blocks of physical memory remotely lendable over the communications network; and
a memory borrowing device comprising:
a communications link to the communications network;
a borrower agent comprising:
instructions executable by a processor; and
a Virtual Machine (VM) Extension configured to facilitate access to a block of physical memory allocated to the memory borrowing device; and
one or more processors configured to execute instructions of the borrower agent;
assigning, by the lender agent, Internet Protocol (IP) addresses to the one or more blocks of physical memory remotely lendable over the communications network;
allocating, by the lender agent, one of the one or more blocks of physical memory remotely lendable over the communications network to the memory borrowing device;
determining, by the VM Extension, an Internet Protocol (IP) address of the allocated block of physical memory; and
accessing, over the communications network by the memory borrowing device using the Internet Protocol (IP) address, the allocated block of physical memory.

12. The method of claim 11 further comprises, reserving for lending by the lender agent, the one or more blocks of physical memory remotely lendable over the communications network from memory resident on the memory lending device.

13. The method of claim 12 further comprises, communicating by the lender agent, a number indicating the number of the one or more blocks of physical memory remotely lendable over the communications network.

14. The method of claim 13 further comprises:
securing, by the borrower agent, allocation of the allocated block of physical memory from the memory lending device; and
receiving, by the borrower agent, permission to access contents of the allocated block of physical memory.

15. The method of claim 14 further comprises, building by the borrower agent, a memory map table mapping the allocated block of physical memory to the IP address, wherein the memory map table is usable to map a virtual memory address of an application to the IP address.

16. The method of claim 15, further comprises:
assigning, by the memory borrowing device, an application to virtual address space mapped in the memory map table to the IP address;
determining from the memory map table, by the borrower agent upon an occurrence of a page fault related to the application, the IP address of the allocated block of physical memory and a local address;
retrieving, by the memory borrowing device, contents of the allocated block of physical memory by copying the contents from the allocated block of physical memory to the local address.

17. The method of claim 16, wherein the retrieval of the contents from the allocated block of physical memory uses Remote Direct Memory Access over Converged Ethernet (RoCE).

18. The method of claim 16, wherein the VM Extension of the borrower agent of the memory borrowing device captures and processes the page fault.

19. The method of claim 14, wherein the provided system further comprises a coordinator and the method further comprises, facilitating by the coordinator, allocation of the allocated block of physical memory between the memory lending device and the memory borrowing device, wherein the coordinator coordinates via Border Gateway Protocol (BGP) and interacts with the lender agent and the borrower agent.

20. The method of claim 14 further comprises, relinquishing by the borrower agent, the allocated block of physical memory back to the memory lending device when no longer needed.

\* \* \* \* \*